United States Patent
Browne et al.

(10) Patent No.: US 8,794,885 B2
(45) Date of Patent: Aug. 5, 2014

(54) ACTIVE LASHING MATERIALS AND EYELETS

(75) Inventors: Alan L. Browne, Grosse Pointe, MI (US); Nilesh D. Mankame, Ann Arbor, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 88 days.

(21) Appl. No.: 13/305,761

(22) Filed: Nov. 29, 2011

(65) Prior Publication Data

US 2012/0076608 A1 Mar. 29, 2012

Related U.S. Application Data

(63) Continuation-in-part of application No. 12/363,210, filed on Jan. 30, 2009, which is a continuation-in-part of application No. 12/331,350, filed on Dec. 9, 2008, now Pat. No. 8,109,219.

(51) Int. Cl.
| | | |
|---|---|---|
| B61D 45/00 | (2006.01) | |
| B65D 63/00 | (2006.01) | |
| B65D 63/02 | (2006.01) | |
| B65D 63/06 | (2006.01) | |
| A43C 11/00 | (2006.01) | |
| A43C 5/00 | (2006.01) | |

(52) U.S. Cl.
USPC .............. 410/96; 410/101; 24/20 R; 24/21; 24/68 D; 24/713.6; 24/713.7; 24/713.8

(58) Field of Classification Search
USPC ........ 410/96–116; 24/713.6–713.8, 20 R, 21, 24/68 D
See application file for complete search history.

(56) References Cited

U.S. PATENT DOCUMENTS

| | | | | |
|---|---|---|---|---|
| 2,455,237 | A * | 11/1948 | Davis | 410/97 |
| 4,657,062 | A * | 4/1987 | Tuerk | 160/243 |
| 6,766,566 | B2 * | 7/2004 | Cheng et al. | 24/452 |
| 7,823,382 | B2 * | 11/2010 | Ukpai et al. | 60/527 |
| 8,109,219 | B2 * | 2/2012 | Browne et al. | 112/224 |
| 2004/0074067 | A1 * | 4/2004 | Browne et al. | 24/442 |
| 2006/0186700 | A1 | 8/2006 | Browne et al. | |
| 2010/0139539 | A1 * | 6/2010 | Browne et al. | 112/224 |

* cited by examiner

*Primary Examiner* — Jeremy R Pierce

(57) ABSTRACT

A securing assembly adapted for promoting a more secure relationship through active material actuation, facilitating lashing, attenuating tension, reducing slack, and/or facilitating unlashing, include selectively or passively modified lashing material and/or eyelets comprising active material elements.

9 Claims, 3 Drawing Sheets

ACTIVE LASHING MATERIALS AND EYELETS

CROSS REFERENCE TO RELATED APPLICATIONS

The present application is a continuation-in-part of each of: U.S. patent application Ser. No. 12/363,210, filed on Jan. 30, 2009; and U.S. Patent application Ser. No. 12/331,350, filed on Dec. 9, 2008(now U.S. Pat. No. 8,109,219), both of which are hereby incorporated by reference.

BACKGROUND ART

Lashing materials (e.g., laces, rope, twine, cables, tie-straps, etc.) have long been used to secure at least one object or space, often through the use of one or more eyelets fixedly coupled to the object or a securing measure, such as a tarp, cargo net, or canopy. Various examples of the same, featuring fixed configurations, can be found in everyday life. These measures generally rely upon frictional interaction between the lashing material and eyelet(s), as well as manipulation (e.g., tying of knots into, and/or formation of loops by the lashing material, etc.) to fixedly retain the secured relationship. Where manipulation is reversed (e.g., the knot is loosened), it is appreciated that the interactive friction and threaded eyelet configuration is typically incapable of maintaining the secured relationship, and that as a result an insecure relationship may occur.

BRIEF SUMMARY

The present invention concerns a securing assembly comprising active lashing material and/or eyelet that use active material actuation to better or more facilely secure a cargo or space. More particularly, the assembly is useful for selectively modifying the interaction between the lashing material and eyelets, so as to facilitate threading, promote a more secured relationship, provide a holding mechanism that retains the lashing material in the more secured relationship when the active material element is deactivated, and/or facilitate unlashing when removal is desired. The invention enables attenuated tensioning of and selectively reducing slack in the lashing material, and is useful for dissipating shock loads transmitted to anchor points, and from the points to any tied-down cargo.

Thus, in general, the invention presents a securing assembly adapted for fixing at least one object, so as to achieve a secured relationship. The assembly includes at least one eyelet defining an inside diameter, and a lashing material defining a general cross-sectional diameter less than the inside diameter, so as to be threaded through said at least one eyelet. Either the eyelet(s) and/or material further comprise an active material element operable to undergo a change in fundamental property when exposed to or occluded from an activation signal, so as to be activated and deactivated, respectively. The change in fundamental property is used to modify the inside or cross-sectional diameter (or the tension such as through slack removal in the lacing material), so as to further secure said at least one object or facilitate threading the lashing.

Other aspects and advantages of the present invention will be apparent from the following detailed description of the preferred embodiment(s) and the accompanying drawing figures.

BRIEF DESCRIPTION OF THE SEVERAL VIEWS OF THE DRAWING

A preferred embodiment(s) of the invention is described in detail below with reference to the attached drawing figures, wherein.

DETAILED DESCRIPTION

Figure 1:
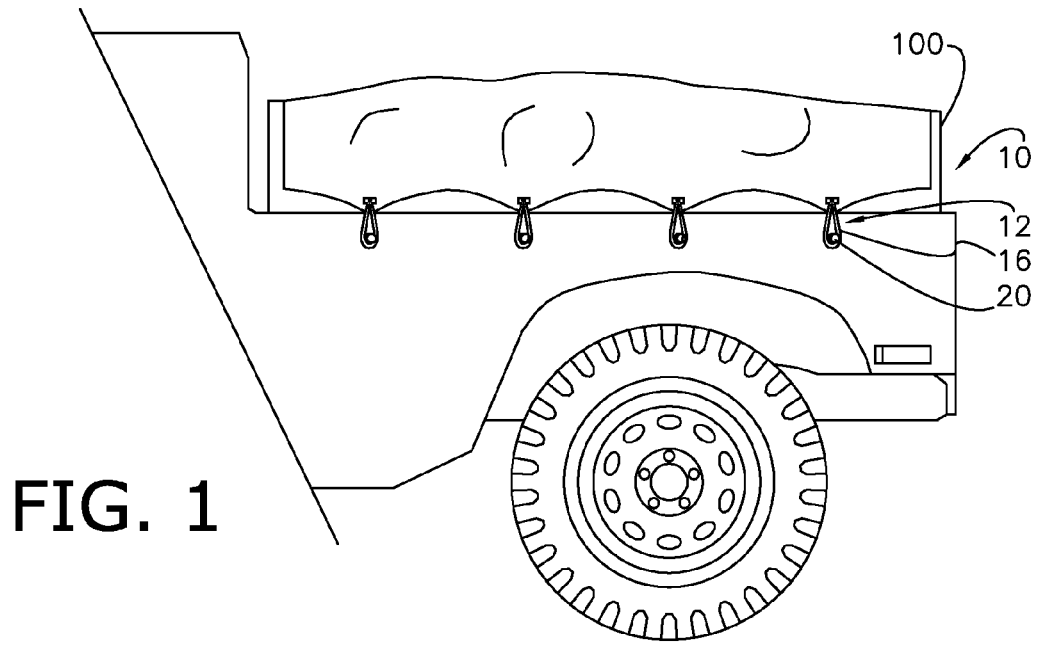
FIG. 1 is an elevation of a flat bed truck having a cargo stored thereupon, and a securing assembly engaging the cargo, and comprising a tarp, lashing material, and plurality of eyelets, in accordance with a preferred embodiment of the invention.

Referring to FIGS. 1-5, the present invention concerns a securing assembly 10 including an active lashing material 12 and at least one eyelet 14 for receiving the material 12. That is to say, the lashing material 12, and/or eyelet(s) comprise an active material element 16 in various geometric forms (e.g., wires, straps, cable strands, beads, rings, etc.). The assembly 10 is contemplated for on-demand and/or passive use in a wide variety of applications, and more particularly, wherever lashing/lacing materials are used to secure a cargo (e.g., one or more objects) 100. In a particular embodiment, the assembly 10 composes an article of clothing or footwear 102 (FIG. 5), so as to be used to further support or add comfort to a body part (not shown). Other applications include tie-downs for uniform tensioning of cargo, boat, and seat covers, and more particularly, to a self-tightening and/or slack eliminating drawstring that is pseudoplastically stretched to provide a larger opening or perimeter for ease of insertion/application and then activated to reduce the size of the opening or perimeter. The following description of the preferred embodiments of the invention is merely exemplary in nature and is in no way intended to limit the invention, its application, or uses.

As used herein the term "active material" shall be afforded its ordinary meaning as understood by those of ordinary skill in the art, and includes any material or composite that exhibits a reversible change in a fundamental (e.g., chemical or intrinsic physical) property, when exposed to an external signal source. Suitable active materials for use with the present invention include but are not limited to shape memory alloys, and electroactive polymers (EAP) that can function as actuators under fibrous configurations and atmospheric conditions. These types of active materials have the ability to remember their original shape and/or elastic modulus, which can subsequently be recalled by applying or removing an external stimulus. As such, deformation from the original shape is a temporary condition. In this manner, an element composed of these materials can change to the trained shape in response to either the application or removal (depending on the material and the form in which it is used) of an activation signal.

More particularly, shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. The term "yield strength" refers to the stress at which a material exhibits a specified deviation from proportionality of stress and strain. Generally, in the low temperature, or martensite phase, shape memory alloys can be pseudo-plastically deformed and upon exposure to some higher temperature will transform to an austenite phase, or parent phase, returning to their shape prior to the deformation. Materials that exhibit this shape memory effect only upon heating are referred to as having one-way shape memory. Those materials that also exhibit shape memory upon re-cooling are referred to as having two-way shape memory behavior.

Shape memory alloys exist in several different temperature-dependent phases. The most commonly utilized of these phases are the so-called Martensite and Austenite. In the following discussion, the Martensite phase generally refers to the more deformable, lower temperature phase whereas the Austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$).

When the shape memory alloy is in the austenite phase and is cooled, it begins to change into the martensite phase, and the temperature at which this phenomenon starts is referred to as the martensite start temperature ($M_s$). The temperature at which austenite finishes transforming to martensite is called the martensite finish temperature ($M_f$). Thus, a suitable activation signal for use with shape memory alloys is a thermal activation signal having a magnitude to cause transformations between the martensite and austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the martensite to Austenite phase transformation, and the material will recover the original, annealed shape. Hence, one-way shape memory effects are only observed upon heating. Active materials comprising shape memory alloy compositions that exhibit one-way memory effects do not automatically reform, and will likely require an external mechanical force to reform the shape that was previously suitable for airflow control.

Intrinsic and extrinsic two-way shape memory materials are characterized by a shape transition both upon heating from the martensite phase to the austenite phase, as well as an additional shape transition upon cooling from the austenite phase back to the martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effect are composite or multi-component materials. They combine an alloy that exhibits a one-way effect with another that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

It is appreciated that SMA's exhibit a modulus increase of 2.5 times and a dimensional change (recovery of pseudo-plastic deformation induced when in the Martensitic phase) of up to 8% (depending on the amount of pre-strain) when heated above their phase transition temperature. It is appreciated that where the SMA is one-way in operation, a biasing force return mechanism (such as a spring) would be required to return the SMA to its starting configuration. Finally, it is appreciated that Joule heating can be used to make the entire system electronically controllable.

Stress induced phase changes in SMA, caused by loading and unloading of SMA (when at temperatures above $A_f$), are, however, two way by nature. That is to say, application of sufficient stress when an SMA is in its austenitic phase will cause it to change to its lower modulus martensitic phase in which it can exhibit up to 8% of "superelastic" deformation. Removal of the applied stress will cause the SMA to switch back to its austenitic phase in so doing recovering its starting shape and higher modulus, and dissipating energy. More particularly, the application of an externally applied stress causes martensite to form at temperatures higher than $M_s$. The macroscopic deformation is accommodated by the formation of martensite. When the stress is released, the martensite transforms back into austenite and the SMA returns back to its original shape. Superelastic SMA can be strained several times more than ordinary metal alloys without being plastically deformed, however, this is only observed over a specific temperature range, with the largest ability to recover occurring close to $A_f$.

As previously mentioned, it is appreciated that other types of active materials, such as electroactive polymers may be used in lieu of SMA. This type of active material includes those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive, molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

In a preferred embodiment, wherein the lashing material (e.g., lace, rope, thread, cable, tether, etc.) 12 is formed of a suitable active material as delineated above, the invention may be used to eliminate slack by selectively activating the active material. Activation may also be used to effect more uniform tensioning along the longitudinal profile of the material 12. In each of the examples and embodiments described below, it is appreciated that plural separately actuated active material elements 16 may be employed, so as to effect redundancy, and variable strokes. Where the lashing material 12 comprises shape memory alloy wire 16 in a normally Martensitic state, situational tightening may be accomplished by thermally activating the shape memory alloy element 16 through Joule heating. To that end, the lashing material 12, such as a series of tethers (FIG. 1), or cargo straps (FIG. 2) may be electrically coupled to a signal source 18. In an automotive application, for example, the signal source 18 may be the vehicle charging system (e.g., battery, etc.). In FIG. 1, for example, a series of prongs 20 which anchor the tethers on each side of the truck bed may be electrically coupled to the tethers via contacts (not shown).

Figure 2:
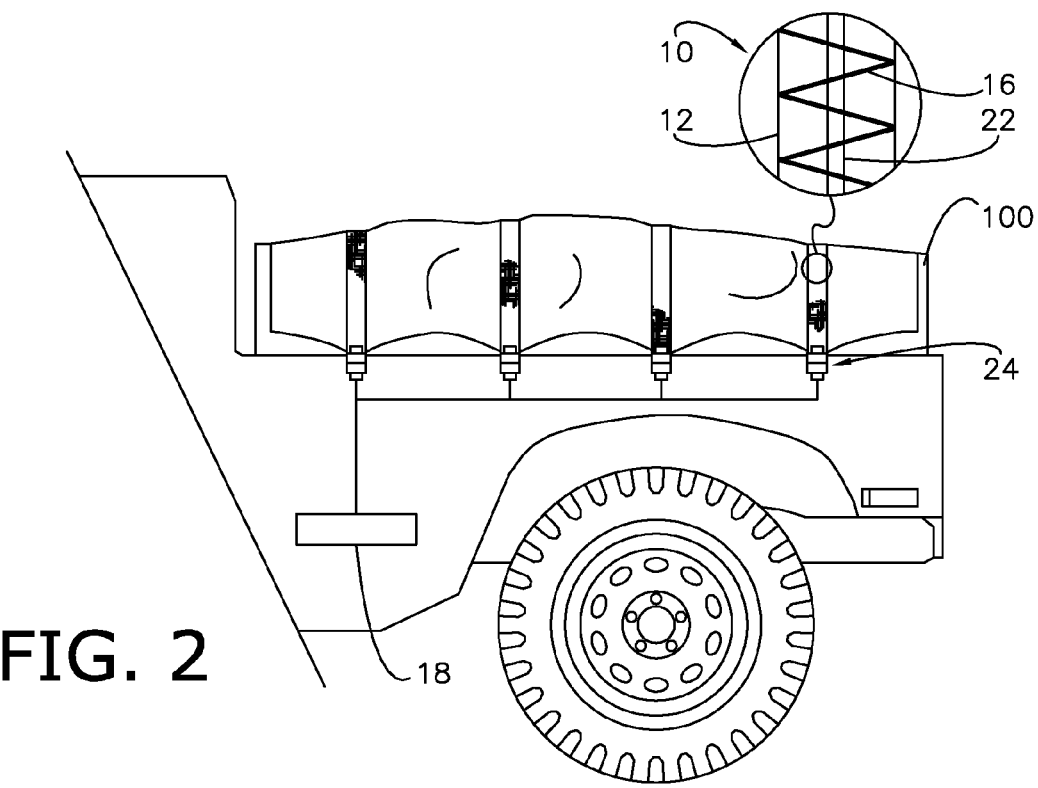
FIG. 2 is an elevation of a flat bed truck having a cargo stored thereupon, and a securing assembly engaging the cargo and comprising a plurality of tie straps, and toggle clamps, in accordance with a preferred embodiment of the invention, and further, in enlarged caption view, shape memory alloy and heating elements woven and embedded within the strap.

Alternatively, a heating element 22 may be included within the lashing material 12, and coupled to the signal source 18, so as to be operable to generate enough heat energy to activate the shape memory alloy element(s) 16 (FIG. 2). For example, the lashing material 12 may include a fabric formed of shape memory alloy wires 16 and thermally resistive elastic fibers, and an electrically resistive heating wire 22 embedded within the fabric. In lieu of or addition to the resistive wire, the heating element 22 may present a conduit fluidly coupled to and operable to convey a heated or cooling fluid (e.g., engine coolant) may be disposed inside the fabric. The resistive wire or conduit 22 is configured such that the lashing material 12 is able to shorten in effective length (e.g., able to adopt a more sinuous longitudinal profile), when the element 16 is activated or deactivated.

In another embodiment, the lashing material 12 comprises shape memory alloy in a normally Austenitic state, and is passively activated by utilizing the superelastic effect thereof. That is to say, when the lashing material 12 is caused to undergo a sufficient stress load, it is caused to transform from the Austenite to the more malleable Martensite phase, thus, producing give in the material 12, and upon return to the Austenite phase, energy dissipation. In this configuration, the non-active structure of the lashing material 12 must therefore, be configured to stretch or lengthen. In this embodiment, it is appreciated that the constant binding force and energy dissipation offered thereby allows securement of more delicate objects, and that the asymmetric stiffness compensates for cold weather or vibration induced slackening, while increasing the binding force for hot weather-induced expansion.

Where an EAP element(s) 16 is used, the signal source 18 is operable to apply a voltage directly thereto, so as to change the tension within the lashing material 12. In another mode of operation, a voltage is applied to the EAP element(s) 16 to selectively lengthen the lashing material 12 and produce slack. The act of lacing and lashing is then performed while facilitated by the generated slack. Once complete, the voltage is removed causing the slack to be removed and material 12 to tighten and achieve the more secured relationship. It is appreciated that a voltage could then be reapplied to facilitate unlacing and unlashing. Finally, it is also appreciated that the entire lashing material 12 may be formed of active material. For example, the active material element 16, as springs, flats, wires, cables, braids, etc., may be used as straps 12 themselves, or integrated into straps made of other elastomeric or stretchable materials as segments, laminates, cables, or wires woven into, embedded in, or otherwise mechanically coupled.

The preferred assembly 10 further includes toggle clamps 24 configured for securing and imparting a desired tension to the lashing material (e.g., straps, cables, etc.) 12 (FIG. 2). To the extent that the lashing material comprises an electrically activated active material element 16, the clamp 24 may present the necessary contacts/lead. For example the distal end of the lashing material may be coupled to a male connector (not shown), while the toggle clamp 24 defines a female receptacle (also not shown) configured to securely receive the male connector. Thus, in exemplary operation, the clamps 24 are released to enable engagement with a tie strap 12 comprising an SMA element 16. The clamp 24 is then closed thereby stretching the Martensitic SMA or taking up the slack in the strap 12 depending on its starting length. The element 16 is then heated, so as to cause it to transform and shorten. Where the strap 12 was relatively taut, activation causes the strap 12 to conform to and apply an even compressive force on the cargo 100. The imparted force is bounded by stress-induced Austenitic to Martensitic transformation, which reduces the chance of over-tightening. Upon cooling, the SMA element 16 retains its reduced length, with some allowance for two-way SMA, and thus, continues to impart force. Otherwise, when access to the cargo 100 is desired, the clamps 24 are released conventionally.

Figure 3:
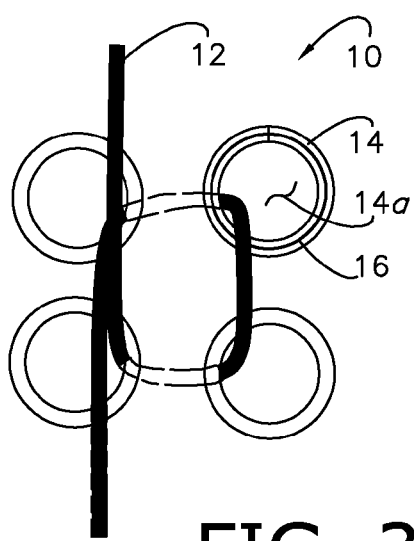
FIG. 3 is a partial elevation of a lashing material threaded through a plurality of opposite eyelets, and forming a loop, in accordance with a preferred embodiment of the invention.
Figure 3A:
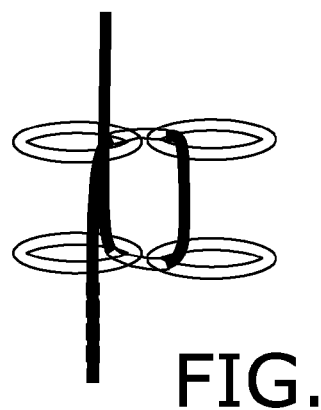
FIG. 3a is a partial elevation of the rope and eyelets shown in FIG. 3, wherein the lashing material has been tightened, and the eyelets deformed.
Figure 3B:
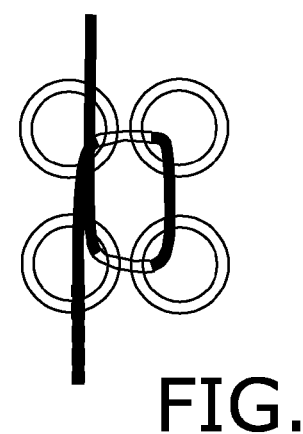
FIG. 3b is a partial elevation of the lashing material and eyelets shown in FIG. 3, wherein the lashing material has been tightened and the eyelets displaced.
Figure 4:
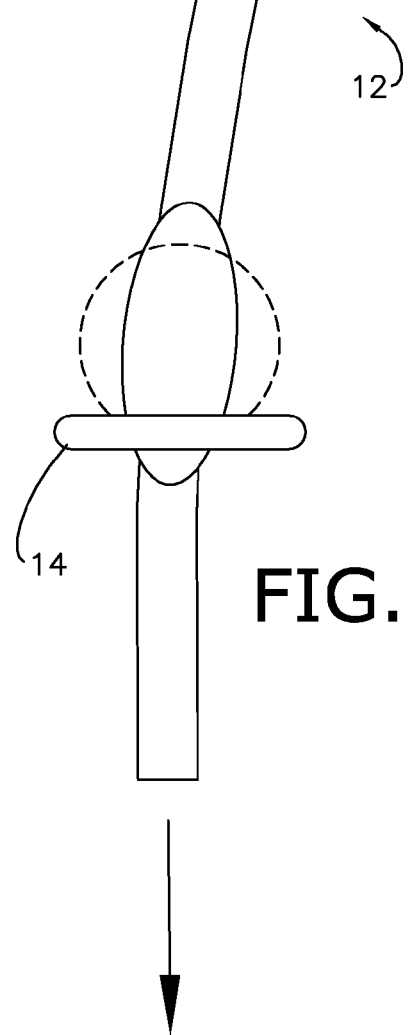
FIG. 4 is a longitudinal section of a lashing material comprising active inserts, in accordance with a preferred embodiment of the invention.
Figure 5:
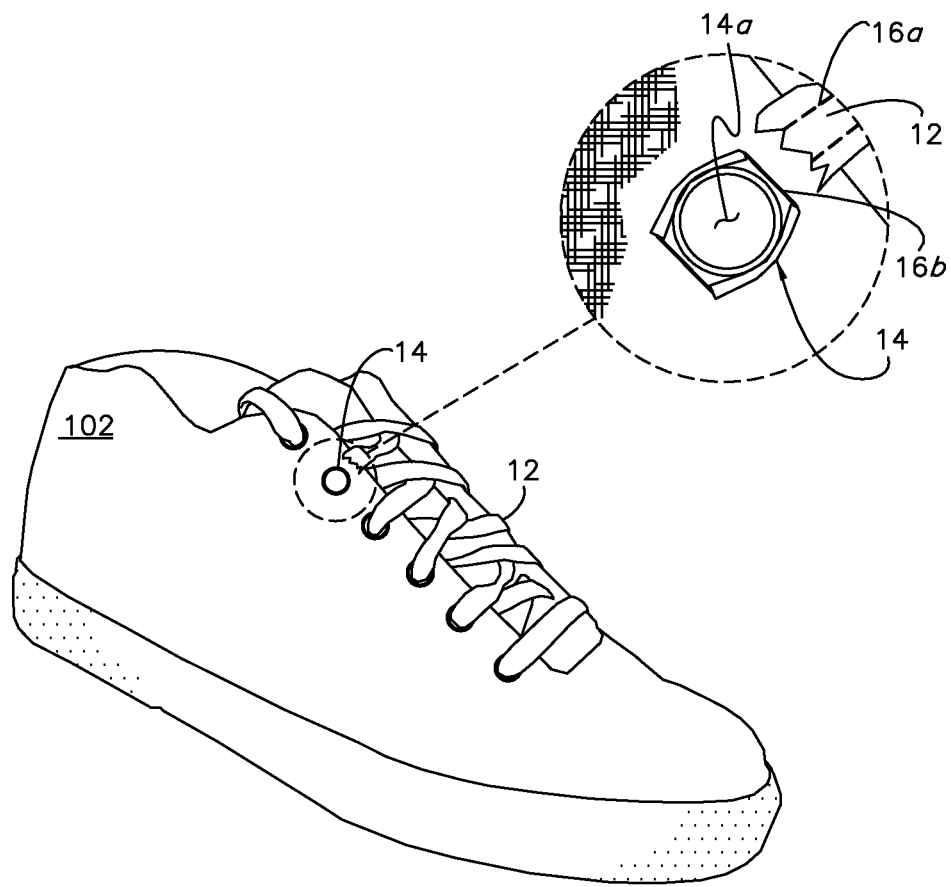
FIG. 5 is a perspective view of a shoe incorporating an active shoe lace and/or eyelets, in accordance with a preferred embodiment of the invention.

FIGS. 3-5 show interaction between a lashing material 12, such as a lace, and a plurality of (e.g., four) eyelets 14. Each eyelet 14 defines an eye 14a that presents an inside diameter. In each embodiment, the lace 12 has been threaded through each eyelet 14 and then doubled-over back through the first two vertically adjacent eyelets 14, so as to form a loop. The lace 12 may be active as previously described, such that activation causes the loop to contract and close. Where the eyelets 14 are non-deformable (FIG. 3b), this action causes them to translate towards each other, thus producing a more secure relationship. Alternatively, the eyelets 14 may be deformable, such that contracting the loop causes them to collapse towards each other and achieve a more ellipsoidal configuration (FIG. 3a). This may be accomplished with elastomeric eyelets 14 presenting a modulus of elasticity that balances support with energy dissipation and give.

In another example, the eyelets 14 are drivenly coupled to an active material element 16. More preferably, the eyelets 14 are formed at least in part of Martensitic SMA having an Austenitic start temperature greater than the highest operating temperature of the application environment. In this configuration, applying a stress load, for example, during threading and knot formation, causes deformation as shown in FIG. 4, wherein the deformation results in the application of a pinching force and a more secure relationship. More particularly, as the lashing material 12 is tightened, the Martensitic eyelets 14 deform by as much as 8% (local strain) and flatten around the lashings material 12. When the tying force is released, the lashing material 12 is retained in the eyelets 14 due to the pinching force and frictional interaction. Heating the eyelets 14 to the Austenitic finish temperature causes them to revert to their memorized shapes shown in FIG. 4; in this condition, the eyelets 14 are dilated, such that the lashing material 12 can be withdrawn or threaded more easily. It is appreciated that the inventive methods of lashing described and illustrated herein may employ other formations of lacing, such as cross, bar, and lock lacing.

In yet another embodiment, the holding force in the secured relationship is increased by using an insert 26 (e.g., bead, ring, etc.) within the structure of the lashing material 12 (FIG. 4). More preferably, a plurality of inserts 26 compose the material 12, and longitudinally interconnect a plurality of non-active, durable sections 28 (FIG. 4); or the sections 28 may also be active as previously described. The inserts 26 are configured to pass through each eyelet 14 in its dilated or widened shape but not its narrow form (FIGS. 3-4). The inserts 26 are preferably spaced such that, once threaded, the lashing material 12 is further retained by their concurrent engagement with the eyelets 14. As such, it is appreciated that the inserts 26 present a maximum cross-sectional diameter greater than, more preferably greater than 105%, and most preferably greater than 115% of the inside diameter defined by the eye 14a. Where the eyelets 14 present fixed geometric shapes, the inserts 26 may be compressible (e.g., formed of elastomeric material or natural rubber, filled with a fluid gel, etc.) such that the actuation force of the active lashing material 12 is sufficient to pull the inserts 26 through the eyelets 14. In this configuration, it is appreciated that the eyelets 14 serve as a holding mechanism that retains the secured relationship, when the active material element 16 is deactivated. The inserts 26 may present leading sloped faces to facilitate one-way travel, and/or ratcheting configurations where plural stroke lashing materials 12 are employed.

Alternatively, where the eyelets 14 present fixed geometric shapes, the inserts 26 may themselves be formed at least in part by an active material element 16, such that their geometric shapes are actively modified or their ability to change shapes is actively modified. For example, as shown in FIG. 4, the inserts 26 may each present a ring-like configuration, made of Austenitic SMA (or a baroplastic, SMP). In a normally wide geometric shape, each insert 26 is unable to pass through the associated eye 14a; but in the flattened or more narrow condition pass easily therethrough. The inserts 26 are preferably integrated into the lashing material 12, such that the tensile tying/pulling load results in a stress-induced Austenite to Martensite transformation.

Where one-way SMA is used, the inserts 26 become more pliable in the Martensitic state, and are able to be manually flattened and pulled through the eyelets 14 during threading/withdrawing. Relaxing the pulling force causes a reverse transformation that causes the inserts 26 to revert back to their widened shape. It is appreciated that the assembly 10 may be configured such that potentially harmful cargo accelerations exert a stress upon the active inserts sufficient to cause their transformation and ability to pass through the eyelets 14. This results in energy dissipation, the lashing material 12 providing increasingly more slack, and a passively and selectively actuated mode of operation. It is appreciated that the inserts 26 may comprise two-way SMA, such that transformation and reverse transformation results in automatic flattening and widening respectfully. Finally, it is also appreciated that an elastomeric core 30 may be incorporated within each insert 26 to provide a return bias towards the widened shape.

In FIG. 5, the illustrated assembly 10 composes an athletic shoe 102, and presents a preferred embodiment wherein the lashing material 12 and eyelets 14 comprise first and second active material elements 16a,b, respectively. For example, the active material elements 16a,b may be formed at least in part by shape memory alloy in a normally Martensitic state, and cooperatively configured such that the lashing material (lace) 12 is caused to shorten and reduce slack, and the eyelet 14 is caused to collapse and better retain a secure relationship, when the active material elements 16a,b are activated. Activation may occur passively by solar radiation and heat, e.g., during jogging, or on-demand by exposing the elements 16a,b to a heating source 18 after the shoe 102 is placed upon a foot. In a preferred embodiment, the active material elements 16a,b are cooperatively configured such that the first element 16a is caused to activate and modify the lashing material 12 prior to activation and modification of the second elements 16b and eyelets 14. As such, it is appreciated that the elements 16a,b may be formed of SMA having differing constitutions, cross-sectional areas, or surface treatments (e.g., emissivity, etc.), so as to present different transformation temperature ranges. It is appreciated that the assembly 10 may be employed by other items of clothing and footwear, including but not limited to corsets, girdles, ice skates, snow skis, and boxing gloves.

This invention has been described with reference to exemplary embodiments; it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

Ranges disclosed herein are inclusive and combinable (e.g., ranges of "up to about 25 wt %, or, more specifically, about 5 wt % to about 20 wt %", is inclusive of the endpoints and all intermediate values of the ranges of "about 5 wt % to about 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

What is claimed is:

1. A securing assembly comprising:
a lashing material including:
a non-active member having a constant lashing diameter;
an active material element drivenly coupled and longitudinally connected to the non-active member, the active material element having a normal diameter greater than the lashing diameter and an activated diameter less than the normal diameter; and
a compressible core enveloped by the active material element, the compressible core being an elastomeric material, a natural rubber, or a fluid gel;
wherein the active material element comprises a material selected from the group consisting of shape memory alloys, shape memory polymers, electroactive polymers, and baroplastics; and
at least one eyelet having a fixed geometry that defines an inside diameter that precludes the active material element and the compressible core from being pulled therethrough when the active material element has the normal diameter and that enables the active material element and the compressible core to be pulled therethrough when the active material element has the activated diameter.

2. The assembly as claimed in claim 1, wherein the compressible core presents a bead, disk, or ring formed of a shape memory alloy configured to make a stress-induced Austentite to Martensite transformation.

3. The assembly as claimed in claim 1, wherein the active material element is a superelastic shape memory alloy in its Austenitic shape, and is activated by stress induced through engagement with one of said at least one eyelet.

4. The assembly as claimed in claim 1, wherein the active material element comprises the shape memory alloy in a normally Austenitic state.

5. The assembly as claimed in claim 1, wherein the lashing material presents a structure selected from the group consisting of an anchoring cable, a tie strap, a shoe lace, a cargo net, and a tether.

6. The assembly as claimed in claim 1, wherein the active material element is thermally activated, and the lashing material further includes a heating or cooling element thermally coupled to the active material element.

7. The assembly as claimed in claim 1, wherein the active material element is formed of a two-way shape memory alloy.

8. The assembly as claimed in claim 1, wherein an actuation force of the active material element compresses the compressible core to enable the lashing material to be pulled through the at least one eyelet.

9. The assembly as claimed in claim 8, wherein the at least one eyelet serves as a holding mechanism that retains the lashing material in a secured relationship though the at least one eyelet when the active material element is deactivated.

* * * * *